United States Patent [19]

Yokoyama et al.

[11] Patent Number: 4,683,903
[45] Date of Patent: Aug. 4, 1987

[54] GOVERNOR VALVE

[75] Inventors: Fumitomo Yokoyama, Anjo; Yoshinari Kuwayama, Tokoname; Mitsugu Tatsuta, Tokyo; Koujiro Kuramochi, Okazaki, all of Japan

[73] Assignees: Aisin Warner Limited; Toyota Jidosha Kabushiki Kaisha, both of Japan

[21] Appl. No.: 770,408

[22] Filed: Aug. 28, 1985

[30] Foreign Application Priority Data

Aug. 31, 1984 [JP] Japan ................................ 59-183220

[51] Int. Cl.⁴ ........................................... G05D 13/38
[52] U.S. Cl. ...................................................... 137/56
[58] Field of Search ......................................... 137/56

[56] References Cited

U.S. PATENT DOCUMENTS 3,906,975  9/1975  Craig ....................................... 137/56
4,194,518  3/1980  Iwanaga ............................. 137/56 X
4,323,093  4/1982  Whitney ................................. 137/56

Primary Examiner—Robert G. Nilson
Attorney, Agent, or Firm—Steele, Gould & Fried

[57] ABSTRACT

A governor valve for a hydraulic controller in an automatic transmission, which is disclosed herein, comprises an adapter having a line pressure supply bore made therethrough, a cylindrical governor rotary shaft loosely fitted into the adapter sleeve and having a line pressure supply port made therein, the port including notches intersecting the axis at right angles, a centrifugal weight mounted on one end of the governor rotary shaft and having a return spring, and a spool adapted to slide within the governor rotary shaft with the weight being urged against one end thereof. In this governor valve, there are provided dirt and dust collecting means for preventing dirt and dust separated by a centrifugal action from collecting in the line pressure supply port during the stoppage of the governor rotary shaft so as to make the shaft stick.

3 Claims, 13 Drawing Figures

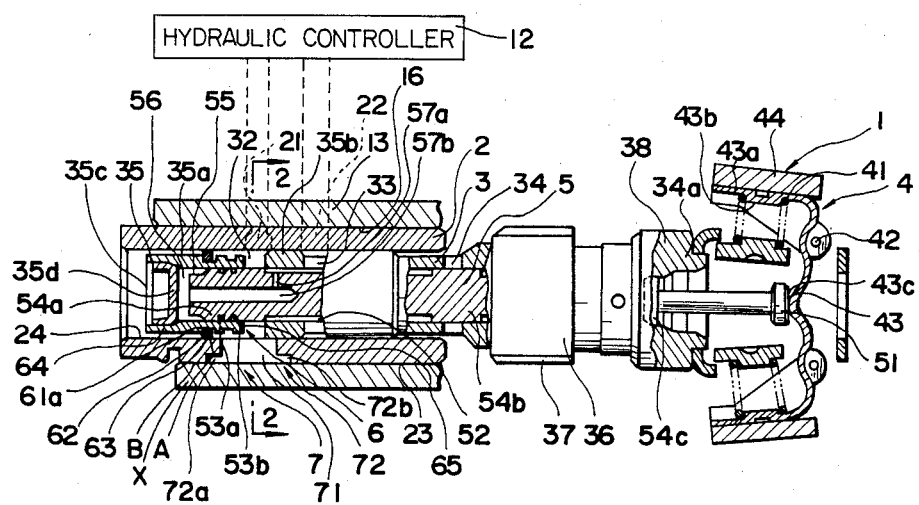
FIG. 1(a)
FIG. 1(c)
FIG. 2
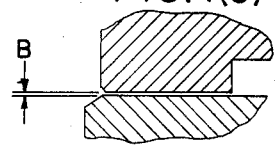
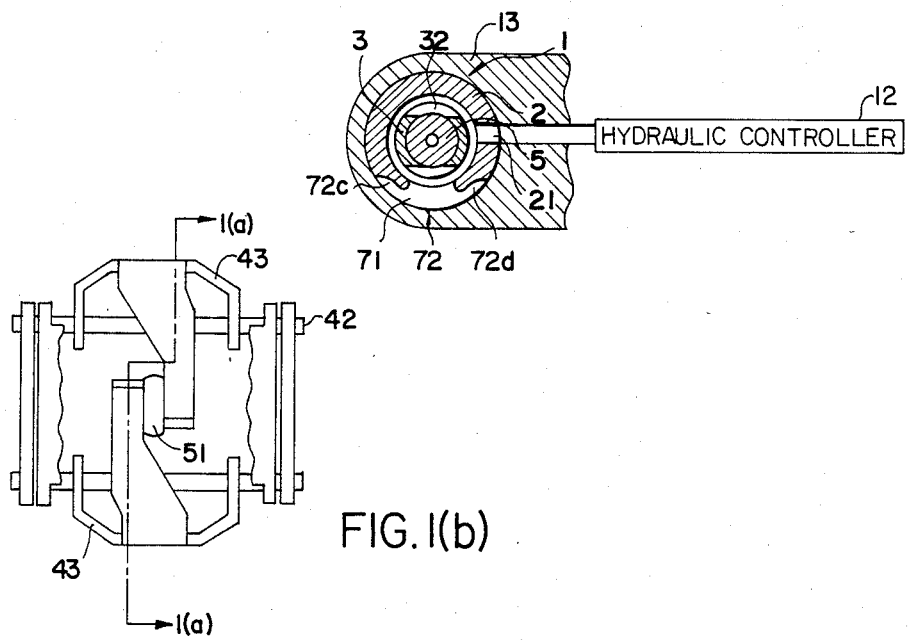
FIG. 1(b)

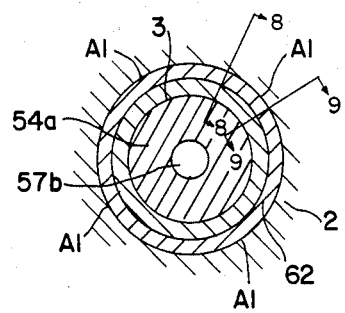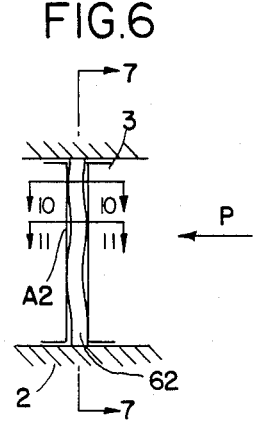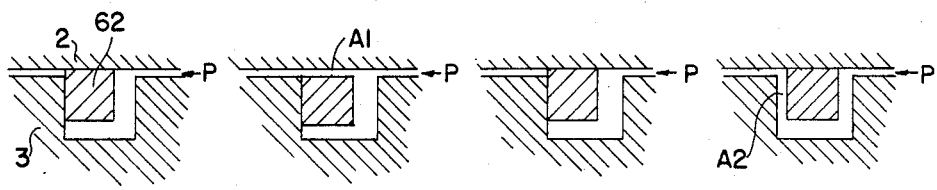

GOVERNOR VALVE

BACKGROUND OF THE INVENTION

1. Field of the Invention

The present invention relates to a governor valve for a hydraulic controller in an automatic transmission.

2. Description of the Prior Art

A conventional governor valve 100, shown in FIGS. 4 and 5, comprises an adapter sleeve 120 having a line pressure supply bore 121 and a governor pressure output bore 122 made therein, a cylindrical governor rotary shaft 130 having a line pressure supply port 132 including notches intersecting the axis at right angles, a governor pressure output port 133 and a drain port 134, a centrifugal weight 140 mounted on one end 134a of the governor rotary shaft 130 and having a spring 141, and a spool 150 adapted to slide within the governor rotary shaft 130 with the weight 140 being urged against one end 151 thereof. In this governor valve, the weight 140 is operated to be opened or closed in accordance with a force due to rotation. Such opening or closing operation causes the spool 150 to slide correspondingly to control the governor pressure depending on the degree of communication of the governor pressure control chamber 152 with the line pressure supply port 132 and the drain port 134, thus supplying the governor pressure through the governor pressure output port 133.

In the governor valve 100 shown in FIGS. 4 and 5, however, dust and dirt in the fluid entering the line pressure supply port 132 of the governor rotary shaft 130 and causing a failure in operation of the governor valve 100 (valve sticking) is apt to collect around the inner peripheral portion 124 of the adapter sleeve 120 under the influence of the centrifugal action when the governor rotary shaft 130 is being rotated. Therefore, if a line pressure oil is fouled, the dust or dirt is difficult to move toward the governor pressure output port 133 and the drain port 134 under the influence of the centrifugal action (the separation of the line pressure oil of different specific weights and the dust contained in the line pressure oil by the centrifugal force). For this reason, the dust in the inner peripheral portion 124 of the adapter sleeve 120 and in the governor pressure control chamber 152 tends to increase in concentration and consequently, such dust is apt to enter into the clearance a between the adapter sleeve 120 and the governor rotary shaft 130, as well as the clearance between the rotary shaft 130 and the spool 150, thus causing the governor valve 100 to become stuck.

SUMMARY OF THE INVENTION

It is therefore an object of the present invention to provide a governor valve wherein an oil entering a line pressure supply port provided in a governor rotary shaft is purified to prevent a valve sticking.

This object is accomplished according to the present invention by providing a governor valve which comprises a adapter sleeve 2 having a line pressure supply bore 21 made therein, a cylindrical governor rotary shaft 3 loosely fitted into said adapter sleeve 2 and having a line pressure supply port 32 made therein which includes notches intersecting the axis at right angles, a centrifugal weight 4 mounted on one end 34a of said governor rotary shaft 3 and having a spring 41, and a spool 5 adapted to slide within the governor rotary shaft 3 with the weight 4 being urged against one end 51 thereof, wherein dust collecting means 6 and 7 are provided for preventing dust separated by a centrifugal action from passing into said line pressure supply port during the stoppage of the governor rotary shaft 3.

With this arrangement, during the rotation of the governor rotary shaft, the dust and dirt separated by centrifugal action is prevented from falling off into the line pressure supply port of the governor rotary shaft by the dust collecting means. Therefore, it is possible to purify the oil entering the line pressure supply port of the governor rotary shaft and to prevent the governor valve from sticking.

BRIEF DESCRIPTION OF THE DRAWINGS

The above and other objects, features and advantages of the present invention will apparent from reading the following description of a preferred embodiment taken in conjunction with the accompanying drawings in which:

FIG. 1(a) is a sectional view of a governor valve according to the present invention, taken along the line 1(a)—1(a) in FIG. 1(b);

FIG. 1(b) is a right side elevation of the governor valve shown in FIG. 1(a);

FIG. 1(c) is an enlarged view of the area "X" in FIG. 1(a);

FIG. 2 is a sectional view taken along the line 2—2 of FIG. 1;

FIG. 6 is a diagrammatic view, partially in section, showing the clearances for sealing ring 62;

FIG. 7 is a section view taken along lines 7—7 in FIG. 1(a);

FIG. 8 is a section view taken along line 8—8 in FIG. 7;

FIG. 9 is a section view taken along line 9—9 in FIG. 7;

FIG. 10 is a section view taken along line 10—10 in FIG. 6; and,

FIG. 11 is a section view taken along line 11—11 in FIG. 6.

DETAILED DESCRIPTION OF PREFERRED EMBODIMENT

Figure 3:
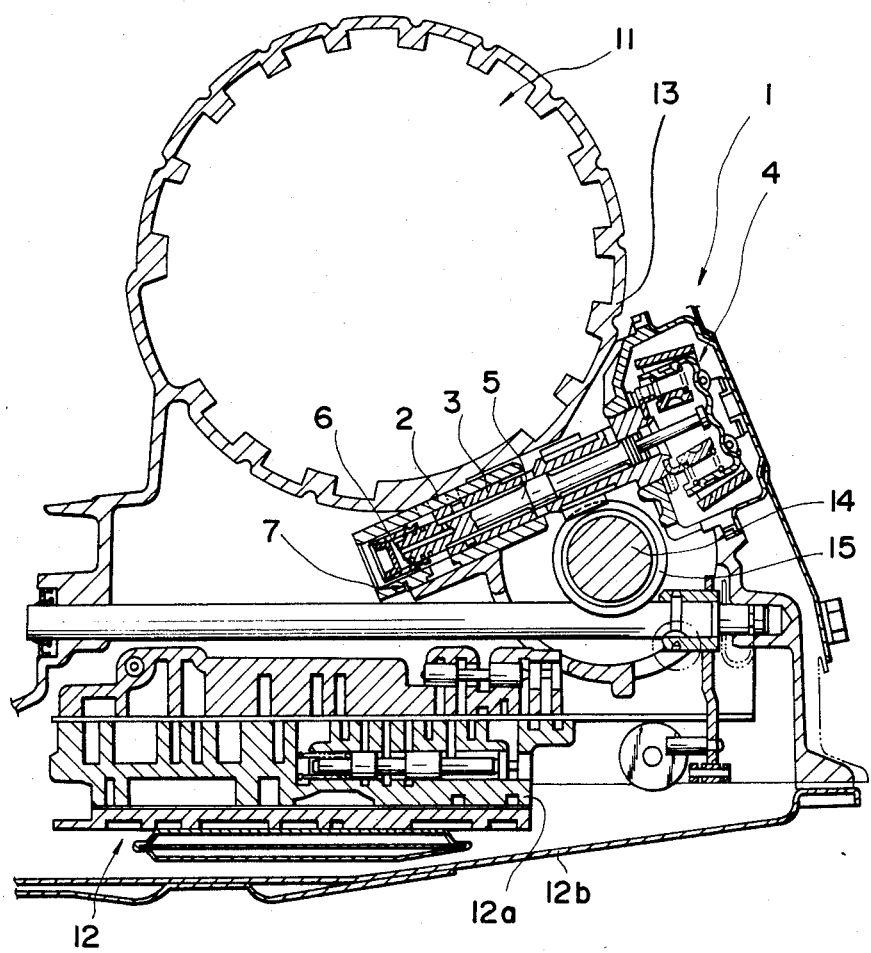
FIG. 3 is a sectional view of an automatic transmission including a governor valve applied therein according to the present invention.
Figure 4:
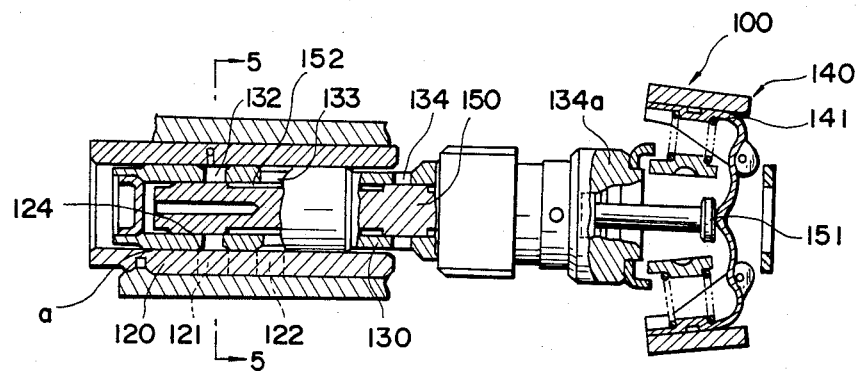
FIG. 4 is a sectional view of a prior art governor valve.
Figure 5:
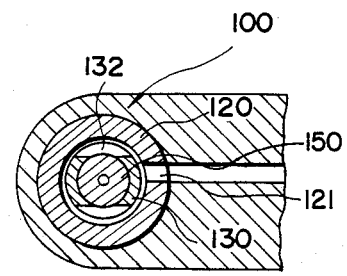
FIG. 5 is a sectional view taken along the line 5—5 of FIG. 4.

Referring to drawings, particularly to FIGS. 1 to 3, there is shown a governor valve 1 according to a preferred embodiment of the present invention, which is mounted on an automatic transmission casing 13 in the vicinity of a hydraulic controller 12 within a valve body 12a for supplying and discharging a hydraulic pressure to and from a hydraulic servo unit of a frictional engaging element in an automatic transmission 11. The governor valve 1 comprises an adapter sleeve 2, a governor rotary shaft 3, a centrifugal weight 4 having a spring 41, and a spool 5.

The adapter sleeve 2 is secured by a pin to the automatic transmission casing 13 having an oil pan 12b which is provided below the casing 13 and contains the valve body 12a therein. The adapter sleeve 2 has a line pressure supply bore 21 and a governor pressure output bore 22 defined radially therethrough and includes a second dust collecting means 7 provided therein.

The governor rotary shaft 3 has the weight 4 mounted on its one end 34a and a leak preventing cap 35d provided in an opening 35c at the other end 35 thereof. A first dust collecting means 6 is provided around the outer periphery 35a at the other end 35, so that oil may leak by a predetermined amount. A governor pressure output port 33 is defined on the other side 35b for controlling the governor pressure (PG) depending on the degree of communication of a governor pressure control chamber 52 with the line pressure supply port 32 and a drain port 34 to supply such governor pressure (PG) through the governor pressure output port 33. The governor rotary shaft 3 includes a driven gear 37 formed at its intermediate portion 36 and meshed with a drive gear 15 formed on a transmitting shaft 14.

The weight 4 is mounted on the one end 34a of the governor rotary shaft 3 and has a plumb 44 attached on the outside 43a of an L-shaped pieces 43, each of which is rotatably supported on a support shaft 42. A spring 41 is mounted on the inside 43b of the L-shaped piece 43, each of so that the weight 4 is opened outwardly in accordance with a force due to rotation, balanced with the spring force of the spring 41. The inner end 43c of the L-shaped piece 43 is engaged by one end 51 of the spool 5 which is slidably provided in a bore 38 within the governor rotary shaft 3 and slides in response to the operation of the opening or closing of the weight 4.

The spool 5 includes ring grooves 53a and 53b provided around the outer periphery at the other end 55 thereof and has even diameter lands 54a, 54b and 54c. Defined between the lands 54a and 54b is the governor pressure control chamber 52 which is in communication with an oil chamber 56 at the other end of the spool 5 through a radial bore 57a and a longitudinal oil passage 57b.

The first dust collecting means 6 comprises a sealing ring 62 mounted in a sealing ring groove 61a made around the outer periphery 35a at the other end 35 of the governor rotary shaft 3 so as to permit oil to leak by a predetermined amount, a clearance A between the outer periphery 63 of the sealing ring 62 and the inner periphery 24 of the adapter sleeve 2, and a weir 65 formed between a sealing ring mounting portion 64 and the line pressure supply port 32. When oil leaks through the sealing ring 62, dusts centrifuged upon rotation of the governor rotary shaft 3 are directed toward the weir 65 thus preventing the dusts from moving toward the line pressure supply port 32. At the same time, as the dusts in the weir 65 are expelled from clearance A at the sealing ring 62, as the oil leaks, the oil supply to the line pressure supply port 32 may be purified, thus preventing sticking of the valve. The clearance A is formed by a radial clearance A1 and an axial clearance A2 as shown in FIGS. 6–11. Arrow P illustrates the direction of line pressure.

The second dust collecting means 7 comprises a dust reservoir 72 and a clearance B between the outer periphery 23 of the adapter sleeve 2 and the wall surface 16 of the automatic transmission casing 13. The reservoir 72 is comprised of a radial bore 71 provided on the same circle as the line pressure supply port 21 in the adapter sleeve 2 and having the same width as the cut-in width of the line pressure supply port 32 in the governor rotary shaft 3, notches 72a and 72b extending in the opposite axial directions from the radial bore 71 and notches 72c and 72d extending in the circumferential direction from the radial bore 71. Therefore, as a result of the leakage of oil through the clearance the dust is expelled if the particles are relatively small; or, the dust is confined in the reservoir 72 if the particles are relatively large. Thus, the dust is collected instead of passed into the line pressure supply port 32. Also, valve sticking is prevented.

What is claimed is:

1. A governor valve, adapted for mounting in a transmission casing, said valve comprising:
    an adaptor sleeve having a line pressure supply bore and a governor pressure output bore made therethrough;
    a cylindrical governor rotary shaft rotatably fitted into said adaptor sleeve and having a line pressure supply port connected to said line pressure supply bore and a governor pressure output port connected to said governor pressure output bore;
    a centrifugal weight mounted on one end of said governor rotary shaft;
    a spool adapted to slide with said governor rotary shaft to connect said line pressure supply bore to said governor pressure output bore according to said weight; and,
    said adapter sleeve further having a dust collecting bore connected to said line pressure supply bore in a transmission casing with a clearance between an outer periphery thereof and a wall of said transmission casing, to leak oil in said line pressure supply port to said clearance through said dust collecting bore.

2. A governor valve according to claim 1, wherein said adapter sleeve has a notch extending in a circumferential direction from the dust collecting bore.

3. A governor valve according to claim 1, wherein said governor rotary shaft comprises: a groove around an outer periphery thereof at an opposite end from the weight; a weir around an outer periphery thereof disposed between said groove and said line pressure supply port; and, a sealing ring mounted in said groove and adapted to permit oil to leak therethrough.

* * * * *